United States Patent
Luick (10) Patent No.: US 6,877,069 B2
(45) Date of Patent: Apr. 5, 2005

(54) HISTORY-BASED CARRY PREDICTOR FOR DATA CACHE ADDRESS GENERATION

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 10/108,532

(22) Filed: Mar. 28, 2002

(65) Prior Publication Data

US 2003/0188124 A1 Oct. 2, 2003

(51) Int. Cl.[7] .............................................. G06F 12/00
(52) U.S. Cl. ................... 711/137; 711/213; 711/214; 711/202; 711/104; 711/3; 711/220; 708/710; 708/670; 712/211
(58) Field of Search ................................ 712/213, 221, 712/211; 711/216, 213, 202, 204, 205, 207, 3, 137, 214, 104, 220, 206; 708/490, 711, 710, 706, 670

(56) References Cited

U.S. PATENT DOCUMENTS

| | | | | |
|---|---|---|---|---|
| 4,578,750 A | * | 3/1986 | Amdahl et al. | 712/221 |
| 4,739,470 A | * | 4/1988 | Wada et al. | 712/217 |
| 5,097,436 A | * | 3/1992 | Zurawski | 708/711 |
| 5,297,266 A | * | 3/1994 | Tanaka | 711/214 |
| 5,713,001 A | * | 1/1998 | Eberhard et al. | 711/216 |
| 5,829,049 A | * | 10/1998 | Walker et al. | 711/168 |
| 5,860,151 A | * | 1/1999 | Austin et al. | 711/213 |
| 6,122,320 A | * | 9/2000 | Bellifemine et al. | 375/240 |
| 6,138,223 A | * | 10/2000 | Check et al. | 711/204 |
| 6,148,318 A | * | 11/2000 | Kawai et al. | 708/605 |
| 6,738,890 B2 | * | 5/2004 | Ishikawa et al. | 711/220 |
| 2002/0184430 A1 | * | 12/2002 | Ukai et al. | 711/3 |

* cited by examiner

*Primary Examiner*—Hong Kim
(74) *Attorney, Agent, or Firm*—Dillon & Yudell LLP (57) ABSTRACT

An address translation logic and method for generating an instruction's operand address. The address generation logic includes an address generation circuit having adders that perform partial sum additions of the instruction operand's base register value with a displacement value in the instruction. The address generation logic also includes a carry prediction history block associated with the instruction that provides predicted carry-in values to the adders during the partial sum addition operation. In a related embodiment, the carry prediction history block that, in an advantageous embodiment, is appended to the instruction includes a predicted row access select (RAS) carry-in value, a predicted column access select (CAS) carry-in value and a confirmation flag that indicates whether the previous carry-in predictions for the previous predicted RAS and CAS carry-in values for the instruction were correct.

23 Claims, 5 Drawing Sheets

HISTORY-BASED CARRY PREDICTOR FOR DATA CACHE ADDRESS GENERATION

BACKGROUND OF THE INVENTION

1. Technical Field

The present invention relates in general to data processing systems and, in particular, to data cache accesses. More particularly, the present invention relates to an address generation circuit that utilizes history-based predicted carry-in values for partial sum adders that are utilized for generating data cache addresses.

2. Description of the Related Art

The use of data caches for performance improvements in computing systems is well known and extensively used. A cache is a high speed buffer which holds recently used memory data. Due to the locality of references nature for programs, most of the access of data may be accomplished in a cache, in which case slower accessing to bulk memory can be avoided. In typical high performance processor designs, the cache access path forms a critical path. That is, the cycle time of the processor is affected by how fast cache accessing can be carried out.

A cache may logically be viewed as a table of data blocks or data lines in which each table entry covers a particular block or line of memory data. The implementation of a cache is normally accomplished through three major portions: directory, arrays and control. The directory contains the address identifiers for the cache line entries, plus other necessary status tags suitable for particular implementations. The cache arrays store the actual data bits, with additional bits for parity checking or for error correction as required in particular implementations. Cache control circuits provide necessary logic for the management of cache contents and accessing. Upon an access to the cache, the directory is accessed or "looked up" to identify the residence of the requested data line. A cache hit results if it is found in the cache, and a cache miss results otherwise. Upon a cache hit, the data may be accessed from the array if there is no prohibiting condition, e.g., protection violation. Upon a cache miss, the data line is normally fetched from the bulk memory and inserted into the cache first, with the directory updated accordingly, in order to satisfy the access through the cache.

Since a cache only has capacity for a limited number of line entries and is relatively small compared with the bulk memory, replacement of existing line entries is often needed. The replacement of cache entries in a set associative cache is normally based on algorithms such as the Least-Recently-Used (LRU) scheme. That is, when a cache line entry needs to be removed to make room for, i.e., replaced by, a new line, the line entry that was least recently accessed will be selected. In order to facilitate efficient implementations, a cache is normally structured as a 2-dimensional table. The number of columns is called the set-associativity, and each row is called a congruence class. For each data access, a congruence class is selected using certain address bits of the access, and the data may be accessed at one of the line entries in the selected congruence class if it hits there. It is usually too slow to have the cache directory searched first, e.g., with parallel address compares, to identify the set position (within the associated congruence class) and then to have the data accessed from the arrays at the found location. Such sequential processing normally requires two successive machine cycles to perform, which degrades processor performance significantly.

Generally, most, if not all, conventional computer architectures require that the cache storage addresses are generated by an address addition of a displacement, or index, with a base register value or address. This addition requires that at least one or more additional pipeline cycles to accomplish, thus, increasing the latency of a data cache access. Sum address and zero delay arithmetic and operand address generation (AGEN) schemes limit the delay penalty by implementing only a few bits of the address adder at a time and generating only a partial sum, e.g., 2–4 bits at a time, assuming that there is no carry-in to the addition, to start a cache access. However, the bits that are utilized to start an access are not the least significant bits, but are higher order bits. These higher order bits are also of higher order than the bits addressing bytes within the cache line that is typically 64–256 bytes or 6–8 bits. Thus, for example, if bits 57–63 of a 64 bit address are utilized to address the bytes within the cache line, bits 50–56 could be used as the address index to begin the data cache access.

Figure 1:
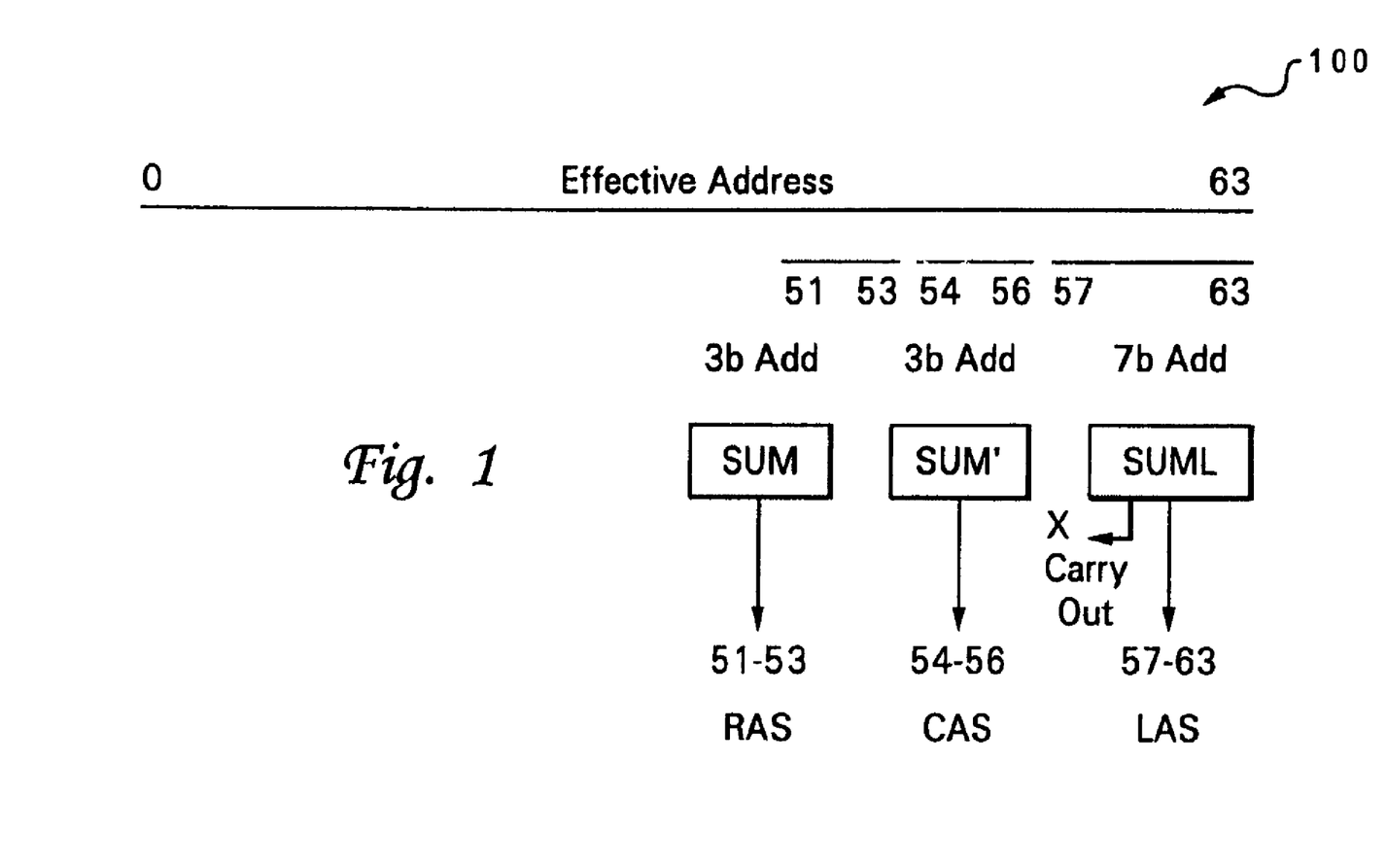
FIG. 1 illustrates a 128 byte data cache line partial sum address generation example.

A basic scheme for partial addition groups without carry propagation will herein be described in conjunction with FIG. 1 that illustrates a 128 byte data cache line partial sum address generation example. As shown, the effective address addition are broken down into multiple, i.e., two or more, small adder portions comprising 2–3 bits each. To improve the access time, either the carry from the 7 bit Line Access Select (LAS) adder is ignored and assumed to be zero, which is true for about 80–90% of the time, or multiple read access paths must be implemented in the data cache to account for the carry-in and not carry-in cases. However, for either of the above described schemes, even though it is better than performing the entire address generation routine and taking another pipeline cycle, there are inherent limitations.

In the case where the 7 bit LAS addition carry-out is simply assumed to be 0, errors are introduced 10–20% of the time when this assumption is incorrect. In this scenario, the resulting address index utilized for the Row Access Select (RAS) and the Column Access Select (CAS) are incorrect. This requires that the cache must be re-accessed with the correct RAS and CAS address index. Conventionally, a single cycle stall and retry would be possible to access the cache with the correct address index. However, future microprocessors architectures are anticipated to have deeper pipelines and frequencies scaling that are much faster than the circuit and wire delays. In these environments, it may take, for example, three or more processor cycles to stop the pipeline process and retry the data cache access, thus negating any time savings in the address generation routine from assuming that the carry-out from the 7 bit LAS addition is zero.

For the case where a read access path is created to access the cache with a RAS and CAS index without a carry-in and a second read access path is utilized to access the cache with a RAS and CAS index with a carry-in, i.e., an extra two-way late selection mechanism, a delay to the data cache array itself is introduced. More importantly, however, is that an additional increase in the order of 50–100% in power dissipation and increase in the chip area to the data cache design is introduced to accommodate the multiple read paths. In systems operating at or above an operating frequency of, e.g., 5 Ghz, power considerations are one of the most important design limitations. A large power dissipation on a large area, such as the data cache, may ultimately force the operating frequency down due to the lowering of the supply voltage by the increased power dissipation.

Accordingly, what is needed in the art is an improved address generation methodology that mitigates the limitations discussed above. More particularly, what is needed in the art is a more effective carry prediction scheme.

SUMMARY OF THE INVENTION

To address the above discussed deficiencies in the prior art, and in accordance with the invention as embodied and broadly described herein, an address translation logic and method for generating an instruction's operand address is disclosed. The address generation logic includes an address generation circuit having adders that perform partial sum additions of the instruction operand's base register value with a displacement value in the instruction. The address generation logic also includes a carry prediction history block associated with the instruction that provides predicted carry-in values to the adders during the partial sum addition operation. In a related embodiment, the carry prediction history block that, in an advantageous embodiment, is appended to the instruction includes a predicted row access select (RAS) carry-in value, a predicted column access select (CAS) carry-in value and a confirmation flag that indicates whether the previous carry-in predictions for the previous predicted RAS and CAS carry-in values for the instruction were correct.

The present invention recognizes that generally about 98% of load instructions will utilize a small, e.g., less than or equal to 12 bits, fixed displacement to generate the effective address and that the remaining 2% of load instructions that are indexed have a nearly invariant index. Furthermore, the base register, which the displacement is added to, is also relatively invariant, especially the base register 12 lower order page address bits. Thus, it can be concluded that the 6–8 least significant bits of the effective address should be relatively repeatable and predictable, and, additionally, that the carry-out from the addition of these 6–8 bits should also be highly predictable.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
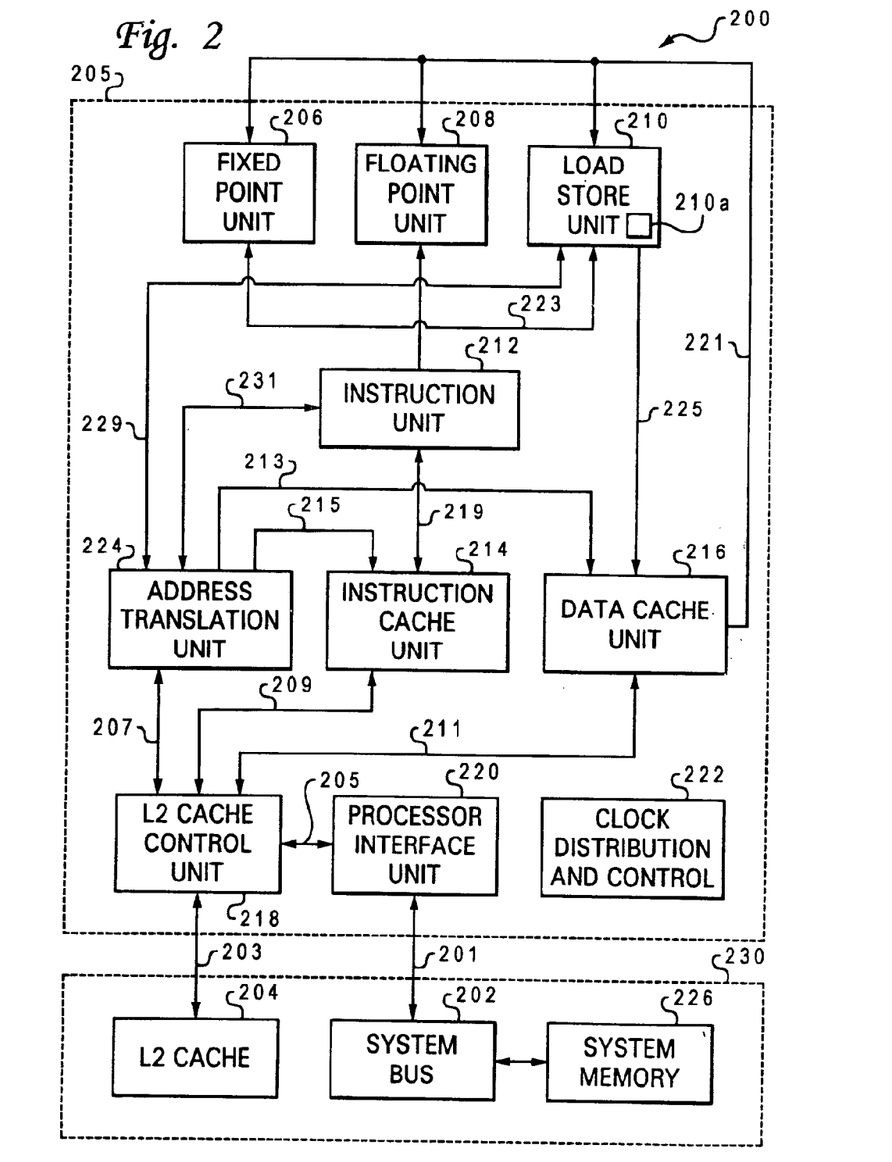
FIG. 2 illustrates an exemplary data processing system having a processor and memory system that provides a suitable environment for the practice of the present invention.

Turning now to FIG. 2, there is depicted an exemplary data processing system 200 having a processor 205 and memory system 230 that provides a suitable environment for the practice of the present invention. As shown, processor 205 is coupled to memory system 230 that includes an interface system bus 202, a L2 cache 204 and a main or system memory 226. Processor 205 includes the following functional units: a fixed point unit (FXU) 206, a floating point unit (FPU) 208, a load store unit (LSU) 210, an instruction unit (IU) 212, an instruction cache unit (ICU) 214, a data cache unit (DCU) 216, a L2 cache control unit 218, a processor interface unit (PIU) 220, a clock distribution and control 222 and address translation unit (ATU) 224. As it is well known to those skilled in the art, in a multiprocessor environment, several processors and their associated L2 caches may to interface system bus 202 allowing shared access to main memory, also known as L3 memory, 226.

The various functional units of processor 205 interface with each other over data, address, and/or control I/O pins, lines and/or busses that will be described in greater detail hereinafter. It should be noted that a "line" can refer to either a single signal line or a collection of signal lines, i.e., a bus. Generally, the functional units of processor 205 communicate as follows. Clock distribution and control 222 provides clocking signals to all functional units on processor chip 205. System bus 202 interfaces to PIU 220 over a bidirectional bus 201 and over a bus 205 with CCU 218. L2 cache 204 communicates with CCU 218 over a bus 203 and CCU 218 communicates instructions with ICU 214 over a bus 209 and with DCU 216 over a bus 211. CCU 218 provides address information to ATU 224 and receives miss interface signals over a bus 207. LSU 210 and IU 212 are utilized to provide request interfaces to ATU 224 and receive translation state information over lines 229 and 231. ATU 224, in turn, provides translated address information to ICU 214 over a line 215 and to DCU 216 over a line 213. ICU 214 interfaces to instruction unit 212 over bus 219 and DCU 216 provides data to FXU 206, FPU 208 and LSU 210 over bus 221 while IU 212 provides instructions to FXU 206, FPU 208 and LSU 210 over bus 223. LSU 210 provides data to DCU 216 over bus 225 and FPU 208 provides and receives data to DCU 216 over a bus 227 to LSU 210.

A dispatcher within load store unit 210 directs instructions from instruction unit 212 to DECODE stage buffers of the various execution units and to a load store unit pipeline buffer. The function of load store unit 210 is to generate effective addresses, e.g., on a 64 bit wide bus, for load and store instructions and to serve as a source and sink for general purpose registers data. During writes to the cache, registers hold the data and addresses and the effective address is computed by an address generation routine (AGEN) utilizing address translation logic 210a. During cache reads, data from the cache is latched in a register and sent to the general purpose registers or to fixed point unit 206. The output of the pipeline buffer is provided to the load store unit's decode and address generator, i.e., AGEN, that contains the general purpose registers and address generation adders and the data output of the decoder is provided to a data register and a data selector. The address output of the AGEN is then provided to an EXECUTE stage buffer.

Figure 3:
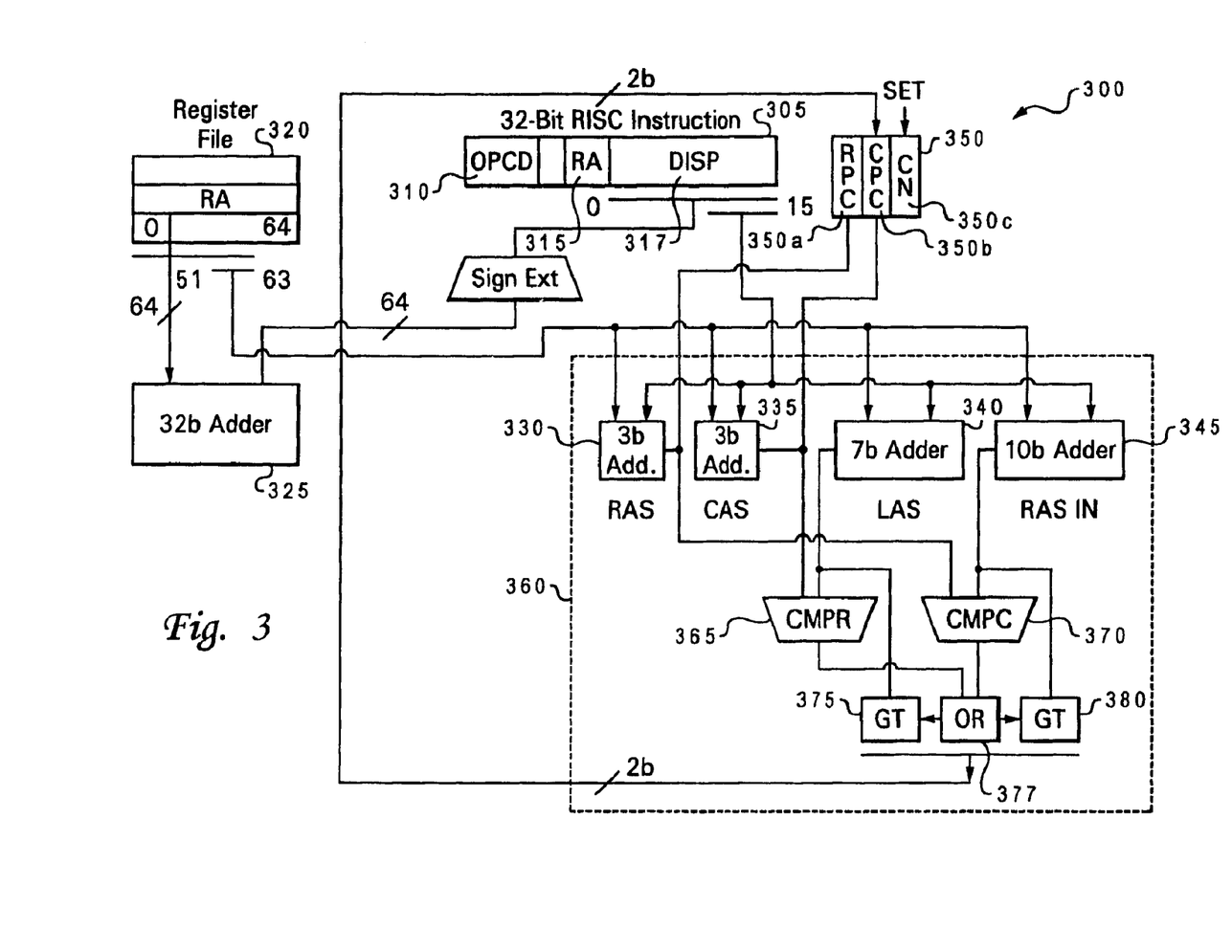
FIG. 3 illustrates a simplified representation of an embodiment of an address translation logic that utilizes a carry-in prediction scheme for a partial effective address (EA) addition in accordance with the principles disclosed by the present invention.

Referring now to FIG. 3, there is illustrated a simplified representation of an embodiment of an address translation logic 300 that utilizes a carry-in prediction scheme for a partial effective address (EA) addition in accordance with the principles disclosed by the present invention. Address translation logic 300 includes a register file 320, which includes the general purpose registers and their contents, coupled to a 32 bit adder. Also depicted in the illustrated embodiment is a representation of a 32 bit RISC instruction 305 having data fields that include an operation code (OPCD) 310, a register address (RA) 315 and a displacement 317. Data in register address 315 specifies a specific register in register file 320 that contains the base register values, or address, that is utilized for specifying a location in a data cache. Generally, the base register values are combined with the values in displacement 317 in an addition operation to generate the effective addresses of the data required by instruction 305.

Address translation logic 300 also includes an address generation circuit 360 and a prediction history block 350 that are utilized to perform the partial addition of the base register values with displacement 317 data to generate the required effective addresses specified by instruction 305. Address generation circuit 360 includes first and second three bit partial EA adders 330, 335, a seven bit partial EA adder 340 and a ten bit partial EA adder 345. It should be noted that address generation circuit employs one additional effective address adder, i.e., ten bit adder 345, than the conventional base partial sum address generation example depicted in FIG. 1. Ten bit adder 345 is utilized to generate the RAS carry-in for first three bit adder 330.

The present invention recognizes that generally about 98% of load instructions will utilize a small, e.g., less than or equal to 12 bits, fixed displacement to generate the effective address and that the remaining 2% of load instructions that are indexed have a nearly invariant index. Furthermore, the base register, which the displacement is added to, is also relatively invariant, especially the base register 12 lower order page address bits. Thus, it can be concluded that the 6–8 least significant bits of the effective address should be relatively repeatable and predictable, and, additionally, that the carry-out from the addition of these 6–8 bits should also be highly predictable.

A carry prediction field 350 that, in an advantageous embodiment, includes 3 bits, utilizes 2 bits to represent a RAS prediction carry-in flag (RPC) 350a and a CAS prediction carry-in flag 350b. RPC 350a and CPC 350b are utilized to provide a history of the prior carry-in values from the last execution of the same program code segment. Carry prediction field 350 also includes a confirmation flag (CN) 350c bit that is utilized to indicate whether or not the last RAS and CAS carry-in predictions were both correct. The "historical" values represented by RPC 350a, CPC 350b and CN 350c serve as the "best guess" of the carry-in values or the next execution of the same instruction, i.e., instruction 305. These three special flag, i.e., RPC 350a, CPC 350b and CN 350c, in an advantageous embodiment, are appended to each load or store instruction to be saved and utilized to predict the carry-ins for the subsequent execution of the instruction.

As with conventional partial addition schemes, first and second three bit adders 330, 335 are utilized to generate the RAS and LAS control signals and seven bit adder 340 is utilized to generate the LAS signal. Address generation circuit 360 also includes first and second comparators 365, 370 that are utilized to determine the accuracy of the values of RPC 350a and CPC 350b. In the case of first comparator 365, the value of CPC 350b is compared to the carry-out of seven bit adder 340 while second comparator 370 compares the value of RPC 350a with the carry-out of ten bit adder 345. The carry-out values of seven bit adder 340 and ten bit adder 345 following the partial sum addition operation is also provided to first and second control gate logic (GTs) 375, 380, also included in address generation circuit 360, that, in turn, provide the actual carry-out values from seven and ten bit adders 340, 345, respectively, to replace the "predicted" values in RPC 350a and CPC 350b for use in the next execution of instruction 305. Also depicted in the illustrated embodiment is a logical OR logic block 377 coupled to first and second comparators 365, 370 that is utilized to control the operation of first and second control gates 375, 380. In a preferred operation, if any of first and second comparators 365, 370 determines that the RAS or CAS carry-in values is not the same as the values of RPC 350a and CPC 350b, OR logic block 377 will selectively control first and second control gates 375, 380 to update the values of RPC 350a and CPC 350b in carry prediction field 350. Additionally, confirmation bit 350c is also set to indicate that the mis-prediction. It should be noted that upon the first execution of instruction 305 that initiates a effective address addition operation, there will not be a previous, or predicted, carry-in values saved in RPC 350a and CPC 350b. In this case, confirmation flag 350c will be set, in an advantageous embodiment, to a value of zero to indicate that the values of RPC 350a and CPC 350b are invalid.

In general, the present invention discloses a novel mechanism that remembers what the carry-in values to the RAS and CAS partial effective address adders, i.e., first and second three bit adders 330, 335, were from a previous execution of the same code segment or instruction. The present invention utilizes the "remembered" carry-in values as a "best guess" of the carry-in values for the next execution of the same instruction. Thus, unlike conventional schemes that ignore or assume a value for the carry-in to the adders, during each address generation (AGEN) operation, the partial addition operation is accomplished with a true or "correct" carry-in value without incurring any processor cycle penalty. Additionally, the accuracy of the predicted carry-in values, i.e., RPC 350a and CPC 350b, are verified after each time the instruction is executed to ensure that the correct values are utilized. In the event that either, or both, first and second comparators 365, 370 determines that the actual carry-in value is not the same as the predicted value saved in RPC 350a or CPC 350b, a error signal is generated to cause a pipeline stall. Following which, the data cache is re-accessed utilizing the correct RAS and CAS addresses following a second partial sum addition operation with the correct carry-in values and to update the RPC 350a, CPC 350b and CN 350c values associated with the load or store operation in the L1 cache. A high-level simplified process flow of the update scheme according to the principles disclosed by the present invention is depicted in FIG. 5. As illustrated in FIG. 5, in the event that either the RAS or CAS carry-in value is determined to be mis-predicted by CMPR or CMPC, analogous to first and second comparators 365, 370 in FIG. 4, the correct carry-in values are then written to the ICache at the current instruction address and the confirmation bit, i.e., CN 350c, is set to zero.

In this manner, in the event that the carry-in prediction history reflected in RPC 350a and CPC 350b changes, for example, because of a change in the base register value, the carry-in prediction history is updated to reflect the new conditions. It should be noted that the prediction history information in prediction history block 350 only needs to be updated in the L1 cache when a change in the predicted values of the carry-in bits occurs which is generally in the order of 5% or less, thus the instruction cache bandwidth and power are not significantly impacted. Furthermore, since cache coherency or consistency is required for the values in prediction history block 350, the update of the values in RPC 350a, CPC 350b and CN 350c may be arbitrarily scheduled to avoid access conflicts with the normal processing of instructions. In an advantageous embodiment, the values of RPC 350a, CPC 350b and CN 350c in the L1 cache may be automatically reflected back up the storage system hierarchy as far back as necessary, including the main system memory, by marking only the L1 instruction cache subline with modified carry-in bits as dirty and casting out these bits to the L2 and/or L3 cache at a reload time. Thus, the carry-in prediction history information can be maintained at all significant cache levels to effectively provide an infinite instruction cache for RPC 350a, CPC 350b and CN 350c values.

Figure 4:
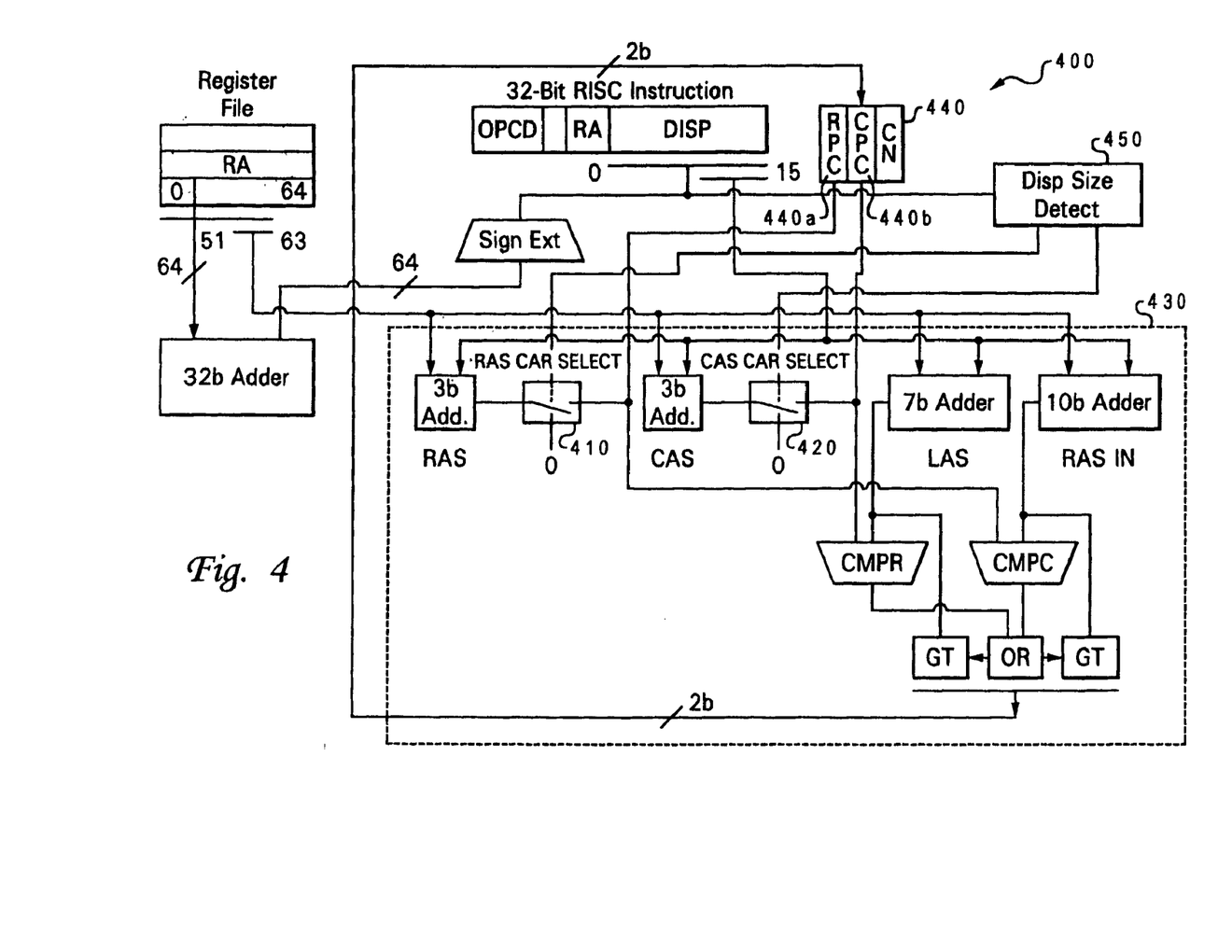
FIG. 4 illustrates a second embodiment of an address translation logic that utilizes a hybrid carry-in prediction scheme for a partial effective address (EA) addition in accordance with the principles disclosed by the present invention.
Figure 5:
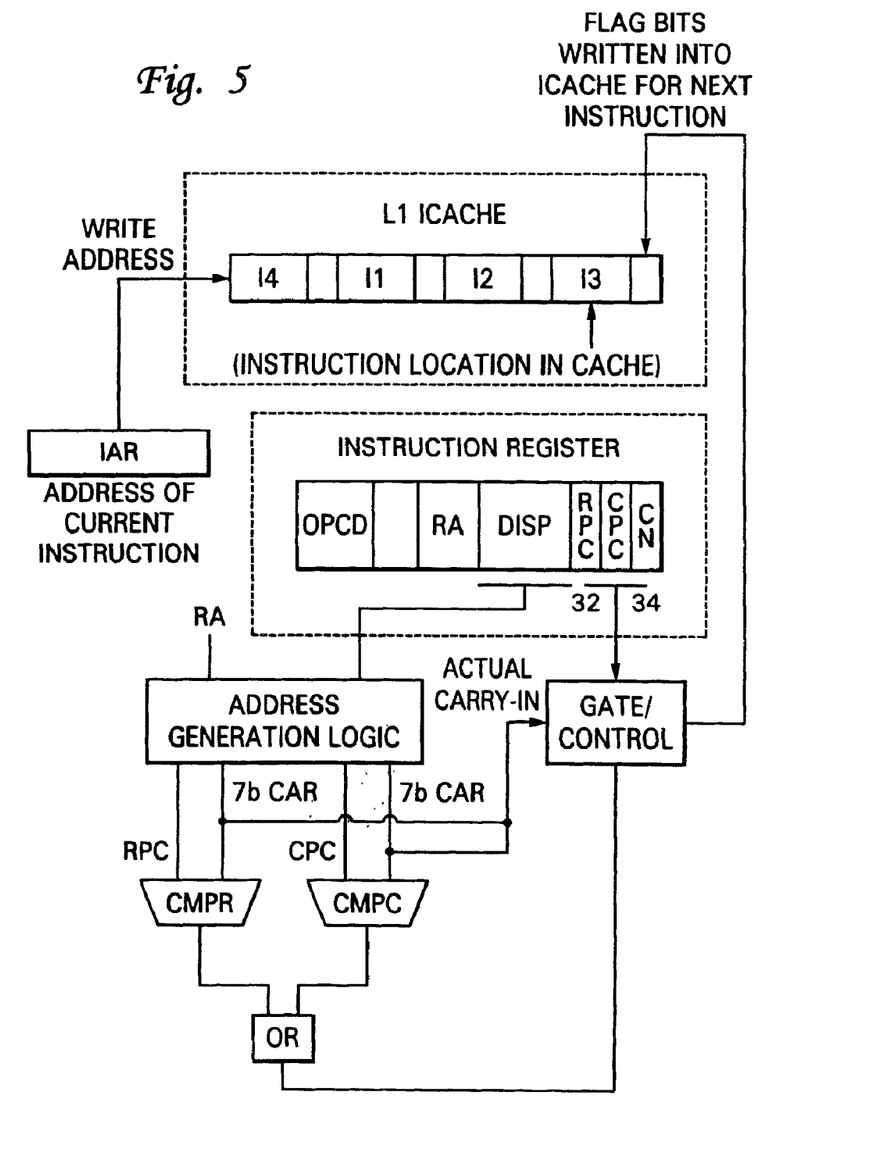
FIG. 5 illustrates a high-level simplified process flow of the carry-in update scheme according to the principles disclosed by the present invention.

Referring now to FIG. 4, there is depicted a second embodiment of an address translation logic 400 that utilizes a hybrid carry-in prediction scheme for a partial effective address (EA) addition in accordance with the principles disclosed by the present invention. Address translation logic 400 is analogous to address translation logic 300 illustrated in FIG. 3 except that an address generation circuit 430 in address translation logic 400 also includes a RAS carry-in selector 410 and a CAS carry-in selector 420. As shown in the illustrated embodiment, address generation circuit 430 also includes a displacement size detection logic 450 that selectively controls the operation of RAS carry-in selector 410 and CAS carry-in selector 420 depending on the size of the displacement.

It has been shown that the ability to predict small values, e.g., a byte or a half word, from a data cache access to be quite reliable for commercial workloads on the order of 75–80% of the time. The lower order bits, e.g., bits 52–63, of a base address value are significantly more predictable due to the fact that the base address values typically begin on cache line boundaries, such as 32 byte-128 byte lines, and are generally addressing a particular structure within a data page that is fixed by the application or operating system. Therefore, the byte address within a data page is generally more likely to be two to three times more predictable, yielding 90–95% predictable 12 bit values. Furthermore, since the displacement is a constant value and indices are nearly so, approximately 90–95% of the 12 lower order effective address bit values are also predictable.

For the 7 lowest order effective address bits, since the base register value will generally have 5, 6 or 7 low order "0" bits, the 7 low order effective address bits will more than likely be 2 to 3 times more predictable, thus yielding predictability levels in the 95–98% range. Furthermore, the displacement values for the effective address computations are generally very small values and often "0". It is estimated that 85% of displacement values in commercial software code have less than or equal to 7 significant bits.

This leads to the present invention's recognition that a 7 bit effective address adder on the 7 low order bits, e.g., bits 57–63, will almost never generate a carry-out if the line size is greater than or equal to 128 bytes, i.e., greater than or equal to 7 bits. Therefore, a "good" prediction for the carry-out of 7 lowest order effective address bits is a no carry-out value from the 7 bit adder for positive displacements, an assumption that is generally correct 90% of the time. However, for very small displacements, i.e., less than or equal to 5 significant bits, which accounts for about 50% of displacements, the probability of a carry-out when bits 57–63 of the effective address are added is only in the order of 1–3%. This is a more accurate prediction of the carry-out when compared to, for example, the utilization of the predicted carry-in scheme described previously. Accordingly, CAS carry-in selector 420 is utilized to selectively switch to a CPC 440b value, i.e., history prediction of a carry-in from the last execution of the instruction, or a carry-in value of 0 depending on the size and sign of the displacement utilizing displacement size detection logic 450. In an advantageous embodiment, CAS carry-in selector 420 will select a carry-in value of 0 if it is determined by displacement size detection logic 450 that the displacement is positive and is less than 5 significant bits, otherwise, CPC 440b is utilized. Address translation logic 400 utilizing this "hybrid" prediction scheme is expected to achieve less than 2% incorrect predictions of the carry-in value for very small positive displacements, which is about half of the displacements encountered. For the other half of displacements, i.e., larger and negative displacement values, expected to be encountered, the realization rate is about 4% mis-predictions for a total expected misprediction rate of about 3%.

Similarly, for the RAS effective address carry-in predictions, RAS carry-in selector 410 is utilized to selectively switch to a 0 carry-in value for a RPC 440a value depending on the sign and size of the displacement value. In an advantageous embodiment, RAS carry-in selector 410 will switch to the history prediction RPC 440b value if it is determined by displacement size detection logic 450 that the displacement value is negative and greater than or equal to 7 significant bits, otherwise, the carry-in value of 0 will be utilized. Generally, for small displacements, the 10 bit effective address adder carry-outs are less likely to occur than for the 7 bit effective address adder, therefore, as with above, a mis-prediction rate of about 3% is also expected.

While the invention has been particularly shown and described with reference to a preferred embodiment, it will be understood by those skilled in the art that various changes in form and detail may be made therein without departing from the spirit and scope of the invention.

What is claimed is:

1. An address translation logic that generates an instruction's operand address, said address translation logic comprising:
    an address generation circuit having at least one adder that performs partial sum addition of said instruction operand's base register value with a displacement value in said instruction; and
    a carry prediction history block that provides a predicted carry-in value to said at least one adder during said partial sum addition, wherein said carry prediction history block is associated with said instruction, and wherein said carry prediction history block includes a predicted row access select (RAS) carry-in value and a predicted column access select (CAS) carry-in value.

2. The address translation logic as recited in claim 1, wherein said carry prediction history block further includes a confirmation flag that indicates whether the previous carry-in predictions for the previous predicted RAS and CAS carry-in values for said instruction were correct.

3. The address translation logic as recited in claim 1, wherein said carry prediction history block is appended to said instruction.

4. The address translation logic as recited in claim 2, wherein said at least one adder includes a ten bit adder that generates an actual row access select (RAS) carry-in value and a three bit adder that generates an actual column access select (CAS) carry-in value.

5. The address translation logic as recited in claim 4, wherein said address generation circuit further includes first and second comparators that compare said actual RAS carry-in value with said predicted RAS carry-in value and said actual CAS carry-in value with said predicted CAS carry-in value, respectively.

6. The address translation logic as recited in claim 5, wherein said address generation circuit further includes a logical OR block coupled to said first and second comparators that determines whether to replace said predicted RAS and CAS carry-in values with said actual RAS and CAS carry-in values in said carry prediction history block.

7. The address translation logic an recited in claim 5, wherein said address generation circuit further comprises:
    a RAS carry-in selector and a CAS carry-in selector; and
    a displacement size detection logic, coupled to said RAS and CAS carry-in selectors, that selectively controls the operation of said RAS and CAS carry-in selectors in response to a determination of a size of said displacement value.

8. The address translation logic as recited in claim 7, wherein said RAS and CAS carry-in selector selects a value of zero responsive to said displacement size detection logic determining that said size of displacement value is positive and less than five significant bits.

9. The address translation logic as recited in claim 6, wherein said actual RAS and CAS carry-in values replace said predicted RAS and CAS carry-in values in said carry prediction history block responsive to either of said predicted RAS carry-in value not being equal to said actual RAS carry-in value and said predicted CAS carry-in value not being equal to said actual CAS carry-in value.

10. A method for efficiently generating an instruction's operand address, comprising:
    associating a carry prediction history block with said instruction, wherein said carry prediction history block contains at least one predicted carry-in value corresponding to said instruction;
    providing said at least one predicted carry-in value to a address generation circuit having at least one adder that performs a partial sum addition of said instruction operand's base register value with a displacement value in said instruction, wherein said at least one predicted carry-in value includes a predicted row access select (RAS) carry-in value and a predicted column access select (CAS) carry-in value of said instruction; and
    utilizing said predicted carry-in value in said partial sum addition.

11. The method as recited in claim 10, wherein said carry prediction history block further includes a confirmation flag that indicates whether the previous carry-in predictions for the previous predicted RAS and CAS carry-in values for said instruction were correct.

12. The method as recited in claim 10, further comprising appending said carry prediction history block to said instruction.

13. The method as recited in claim 11, further comprising generating an actual row access select (RAS) carry-in value and an actual column access select (CAS) carry-in value.

14. The method as recited in claim 13, further comprising:
    comparing said actual RAS carry-in value with said predicted RAS carry-in value and said actual CAS carry-in value with said predicted CAS carry-in value, respectively; and
    replacing said predicted RAS and CAS carry-in values in said carry prediction history block responsive to either of said predicted RAS carry-in value not being equal to said actual RAS carry-in value and said predicted CAS carry-in value not being equal to said actual CAS carry-in value.

15. The method as recited in claim 14, further comprising:
    determining a size of said displacement value;
    selecting a value of zero for said RAS and CAS carry-in values responsive to a determination that said size of displacement value is positive and less than five significant bits.

16. A computer-readable medium having stored thereon a data structure for an instruction, said data structure comprising:
    a first field containing data representing an operation code;
    a second field containing data representing a register address;
    a third field containing data representing a displacement; and
    a fourth field containing data representing predicted carry-in values for partial sum addition in determining said instruction's operand address, wherein said predicted carry-in values include a predicted row access select (RAS) carry-in value and a predicted column access select (CAS) carry-in value.

17. The computer-readable medium as recited in claim 16, wherein said predicted carry-in values further comprise a confirmation flag that indicates whether the previous carry-in predictions for the previous predicted RAS and CAS carry-in values for said instruction were correct.

18. A data processing system, comprising:
    a memory system;
    a processor, coupled to said memory system, wherein said processor including a load store unit having an address translation logic for generating an instruction's operand address, said address translation logic comprising:
        an address generation circuit having at least one adder that performs partial sum addition of said instruction operand's base register value with a displacement value in said instruction; and
        a carry prediction history block that provides a predicted carry-in value to said at least one adder during said partial sum addition, wherein said carry prediction history block is associated with said instruction, and wherein said carry prediction history block includes a predicted row access select (RAS) carry-in valve, a predicted column access select (CAS) carry-in value, and a confirmation flag that indicates whether the previous carry-in predictions for the previous predicted RAS and CAS carry-in values for said instruction were correct.

19. The data processing system as recited in claim 18, wherein said at least one adder includes a ten bit adder that generates an actual row access select (RAS) carry-in value and a three bit adder that generates an actual column access select (CAS) carry-in value.

20. The data processing system as recited in claim 19, wherein said address generation circuit further includes first and second comparators that compare said actual RAS carry-in value with said predicted RAS carry-in value and said actual CAS carry-in value with said predicted CAS carry-in value, respectively.

21. The data processing system as recited in claim 19, wherein said address generation circuit further includes a logical OR block coupled to said first and second comparators that determines whether to replace said predicted RAS and CAS carry-in values with said actual RAS and CAS carry-in values in said carry prediction history block.

22. The data processing system as recited in claim 21, wherein said address generation circuit further comprises:

a RAS carry-in selector and a CAS carry-in selector; and a displacement size detection logic, coupled to said RAS and CAS carry-in selectors, that selectively controls the operation of said RAS and CAS carry-in selectors in response to a determination of a size of said displacement value.

23. The data processing system as recited in claim 22, wherein said RAS and CAS carry-in selectors selects a value of zero responsive to said displacement size detection logic determining that said size of displacement value is positive and less than five significant bits.

* * * * *

UNITED STATES PATENT AND TRADEMARK OFFICE
CERTIFICATE OF CORRECTION

PATENT NO. : 6,877,069 B2
DATED : April 5, 2005
INVENTOR(S) : David Arnold Luick

It is certified that error appears in the above-identified patent and that said Letters Patent is hereby corrected as shown below:

<u>Column 9,</u>
Line 27, "selector" should be -- selectors --.

<u>Column 10,</u>
Line 51, "valve" should be -- value --.

Signed and Sealed this

Twenty-eighth Day of June, 2005

JON W. DUDAS
*Director of the United States Patent and Trademark Office*